May 9, 1939.  M. IRWIN  2,157,756
IRRIGATING APPARATUS
Filed April 1, 1936
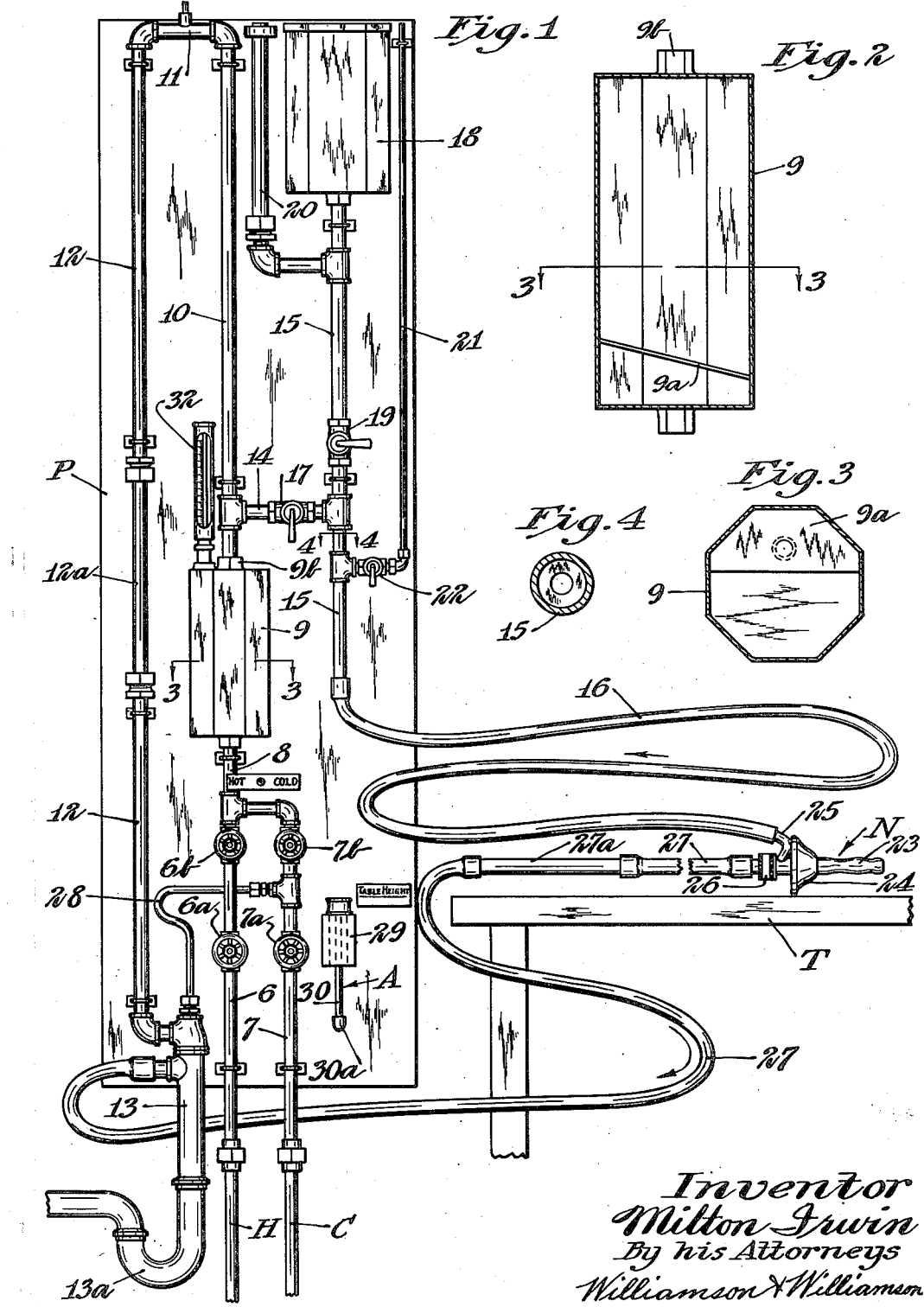
Inventor
Milton Irwin
By his Attorneys
Williamson & Williamson Patented May 9, 1939

2,157,756

UNITED STATES PATENT OFFICE 2,157,756

IRRIGATING APPARATUS

Milton Irwin, Minneapolis, Minn., assignor of one-half to Walter G. Berg, Minneapolis, Minn.

Application April 1, 1936, Serial No. 72,047

5 Claims. (Cl. 128—227)

REISSUED
NOV 5 - 1940

This invention relates to flushing and irrigating apparatus and while capable of numerous uses as such, is particularly designed for irrigating and cleansing the intestinal tract.

In the treatment of colitis, constipation and certain types of rheumatism caused by infection of the colon, intestinal irrigation and high enemas have been found to produce beneficial results. It is essential in irrigating the colon and intestines that the pressure of the liquid utilized be kept below a predetermined limit and if irrigation is to be in the nature of a flushing operation, it is essential that means for continuously supplying the liquid and draining the same be provided for.

It is further desirable that the temperature of the liquid utilized be maintained at a desirable level to prevent scalding or chilling of the patient.

It is an object of my invention to provide efficient irrigating apparatus of the class described which makes provision for the essentials enumerated in the previous paragraph and which may be supplied with hot and cold liquids from the usual domestic sources under pressure.

It is a further object to provide in such apparatus a mixing chamber with means for supplying relative amounts of hot and cold liquids from sources under pressure and apparatus wherein the flow of the mixed liquid is dependent entirely upon gravity due to a column of mixed liquid of a predetermined height.

It is a further object to provide in apparatus of the class described means for injecting into the mixture of hot and cold liquids, proportionate amounts of medicants or antiseptics.

These and other objects and advantages of the present invention will more fully appear from the following description, made in connection with the accompanying drawing, wherein like reference characters refer to the same or similar parts throughout the various views, and, in which, Fig. 1 is a front elevation showing an embodiment of my improved apparatus compactly mounted on a suitable supporting panel;

Fig. 2 is a vertical section taken through the chamber wherein hot and cold liquids are mixed;

Fig. 3 is a cross section taken along the line 3—3 of Fig. 2; and

Fig. 4 is a detail cross section taken on the line 4—4 of Fig. 1.

My apparatus is preferably supplied with hot and cold liquids from conventional sources under pressure, such as the pipes H and C, which are connected with the usual household or office building sources of hot and cold water supply under pressure. In the embodiment of my apparatus illustrated, a pair of upwardly extending pipes 6 and 7 are coupled at their lower ends to the hot and cold water supplies H and C. Pipes 6 and 7 at their upper ends communicate with a short intake conduit 8 which, as shown, connects centrally with the bottom of a casing 9 which forms a mixing chamber. Pipe 6 has a shutoff valve 6a mounted therein and, as shown, a regulating valve 6b disposed some distance above said shutoff valve. Likewise pipe 7 has the shutoff and regulating valves 7a and 7b, such valves being preferably disposed in side by side relation with the corresponding valves of pipe 6. The entire apparatus as shown is mounted on a vertical panel P.

The construction of the interior of the mixing chamber 9 is shown in Figs. 2 and 3, an inclined partition or baffle 9a being secured in said chamber at a short distance above the bottom thereof and traversing a considerable portion of the cross sectional area of casing 9 and being disposed to intercept and deflect the stream of hot and cold liquids which are admitted into the casing through the intake conduit 8. This baffle imparts a swirling and churning motion to the incoming stream of liquid and assists in quickly causing a thorough mixture of the hot and cold water.

An upwardly extending pipe 10 communicates at its lower end with the discharge 9b at the top of mixing casing 9 and is of a desirable height to constitute with the mixing chamber 9 liquid containing means which as will readily be seen, maintains a constant gravity actuated pressure of the mixed liquid because of a predetermined height of a column of the mixed water. The pipe 10 is preferably of considerably greater internal diameter than the water intake pipe 8 in order that there may be an unrestricted overflow connected with the upper end of the liquid containing means, as will hereafter be seen. Pipe 10 connects at its upper end with short pipe section 11 which, in turn, connects with a downwardly extending overflow pipe 12 of, at least, equal internal diameter to the pipe 10. Overflow pipe 12 preferably has an intermediate section 12a constructed of transparent material, such as glass, to enable the flow of overflow liquid to be readily detected. The lower end of overflow pipe 12 connects with a suitable drain conduit 13 having a conventional trap 13a disposed therein. The short pipe section 11 at the top of the upwardly extending pipe 10 is provided with a breather for admitting air to prevent a siphon action between pipes 10 and 12 and in the mixing chamber 9 and pipe 10.

The apparatus illustrated is adapted to be used for flushing out the human colon and, as shown, a table T is mounted close to the supporting panel P and the top thereof is at a predetermined height relative to the height of the liquid containing means (mixing chamber 9 and pipe 10). A patient to be treated lies upon the table T and the water or other fluid or medicants are discharged into the rectum of the patient through a suitable nozzle N, which is connected with the liquid containing means at some suitable point above the discharge end of the mixing chamber 9. As shown, a short elbow pipe 14 communicates with the lower part of pipe 10 and with a vertical conduit 15 which is connected by a flexible hose 16 to the nozzle N. The pipe 15 or, at least, the lower portion thereof below the elbow 14 is reduced in an internal diameter relative to elbow 14, as will be seen by reference to the cross sectional view indicated as Fig. 4. A regulating valve 17 is provided in the elbow 14 and inasmuch as the pressure of the gravity actuated column of water in the liquid containing means is predetermined and valve 17 regulates the amount of fluid discharge, the valve acts also as a pressure regulating valve, that is, to vary actual pressures of liquids discharged into the patient.

The pipe 15 extends for some distance above elbow 14 and communicates at its upper end with the bottom of a tank 18 also mounted on the supporting panel P. Tank 18 is open at its upper end or, if desired, may be provided with a hinged cover and is adapted to contain medicants in solution. The pipe 15, above its connection with the elbow 17, is provided with a medicant flow regulating valve 19. Numeral 20 indicates a tubular glass gauge which is shown as mounted on panel P at one side of medicant tank 18 and connected at its lower end with the pipe 15 to indicate the medicant level within tank 18.

It is sometimes desirable to admit additional air into the flowing stream of mixed liquids and to this end I provide an air induction tube 21 terminating at its upper open end at a level, at least, equal to the level of the overflow pipe section 11 which determines the height of the column of liquid in the liquid containing means. Tube 21 connects with the pipe 15 below the point of connection of the mixing water supply and is preferably provided with a regulating valve 22 which, as shown, is indicated adjacent the point of connection of said tube with pipe 15.

In giving high enemas and colonic irrigations, it is desirable to provide for continuous supply of liquids and drainage of refuse and liquids, and to this end I provide a nozzle construction having a projecting discharge of relatively large diameter for insertion in the rectum and having means connected with said discharge for continuously draining off material while liquids are being supplied through the same passage. My nozzle structure N includes a tubular discharge member 23 of from three-eighths to three-fourths inches in internal diameter having, as shown, a guard or conical plug member 24 attached to the rear portion thereof. Member 23 carries a quick detachable fitting 26 which is adapted to be joined with a cooperating union member secured to a flexible tube or hose 27. Drain hose 27 is connected with the drain 13 and the overflow liquids passing downwardly through overflow pipe 12 into drain 13 cause induction of fluids and material through hose 27 in the direction of the arrow shown in Fig. 1. A glass gauge 27a is interposed in the drain hose 27 adjacent the nozzle. The connection of the nozzle supply hose 16 with the rear portion of the tubular nozzle member 24 is preferably made laterally of the member 24 with the connection member inclined relatively to the axis of member 24 to assist in the return or drainage flow of material.

As further assistance to induce continuous drainage of material, I provide a small injector conduit 28 connected with the source of cold water supply under pressure and having its discharge disposed axially of drain 13 and directed downwardly thereof.

As a means to facilitate insertion of the discharge member 23 of the nozzle and to prevent injury and discomfort to the patient, I provide a removable obturator A which is shown as mounted in an apertured supporting block 29 fixed to panel P. Obturator A has a projecting shank 30 provided with a tapered head 30a of such size as to fit and guard the outer extremity of the nozzle N and to cover the same. The shank is inserted through the rear of the nozzle member N and has an abutment at its end opposite the head 30a which maintains the head in the proper relation to the tubular end of the member 23. The nozzle may then be inserted in the rectum and thereafter the obturator A removed and the nozzle member 24 connected with the hose by means of union 26.

In operation, assuming it is desired to thoroughly irrigate the colon of the patient with water, the regulating valves 6b and 7b of the two pressure supplies of hot and cold water respectively being properly set, the shutoff valves 6a and 7a are opened and hot and cold water flows into the mixing chamber 9 upwardly through the pipe 10 and the overflow is directed to the drain 13 through the overflow pipe 12. A thermometer 32 indicates the temperature of the mixed liquid within mixing chamber 9. When the temperature has obtained the desired level, the regulating valve 17 is open and because of the predetermined height of the liquid containing means (mixing chamber 9 and pipe 10) the gravity actuated pressure of the liquid can never exceed a predetermined amount. The mixed hot and cold water at the desirable temperature and pressure is discharged into the patient through the tubular discharge member 23 and will flush the colon or other parts. The fecal matter and other waste materials and the utilized liquids are removed and drained off through the same passage 23 and are conducted to the drain 13 through the drain hose 27. Flow of such drained materials may be detected by inspecting glass tube 27a.

In giving a treatment, when it is desired to flush the colon by injection of liquid, the flexible hose 27 is squeezed or kinked causing flow of most of the liquid upwardly into the colon. Instant relief from pressure is obtained by releasing the hose 27, whereupon drainage will occur, the liquid passing rearwardly through the nozzle N and being induced to flow by the rearwardly inclined connection of the branch 25 with the discharge member 23 of the nozzle and also by connection of the draining hose 27 with the drain 13 which, as shown, has mounted therein the injector tube 28. In giving a treatment, it is desirable to alternately inject liquid into the colon and drain the same by restricting intermittently the hose 27.

If it is desired to mix with the flow of water medicants from tank 18, the medicant regulating valve is opened. Likewise, if additional air in the mixer is desired, the air regulating valve 22 is opened.

In the foregoing description, it will be seen that I have invented a highly efficient apparatus for giving colonic irrigation and one which may be depended upon to prevent injury or subjection of high pressure or undesirable fluid temperatures to the patient.

It will, of course, be understood that various changes may be made in the form, details, arrangement and proportions of the various parts without departing from the scope of the present invention.

What is claimed is:

1. Irrigating apparatus of the class described comprising a source of continuously flowing liquid under variable pressure, means for transforming said stream into a continuously flowing stream under constant pressure, and means for entraining a stream of gaseous bubbles within said continuously flowing constant pressure stream, whereby a train of said gas is carried with said constantly flowing stream of liquid.

2. An irrigator comprising a tank, an inlet pipe for the tank adapted to be connected to hot and cold faucets of a city or pressure water system, an outlet pipe rising from the top of the tank and provided with a branch which is vented to remove entrapped air from the tank, a second branch connected to said pipe between the first named branch and the tank, a depending pipe connected to the first named branch and constituting a waste pipe, an elbow in the waste pipe adapted to be connected to a sewage system, a jet pipe adapted to be connected to the water system and entering the elbow, a pipe connected to the second named branch pipe, a valve controlling the last named pipe, a tank for supplying a medicinal medium, an outlet for the last named tank, a valve controlling the last named outlet pipe, a common pipe connected to the said last named pipe and to the outlet pipe for the medicinal tank, a flexible hose connected to the common pipe, a nozzle for the hose having a reversely bent inlet connection with the hose, and a pipe adapted to connect the nozzle with the sewage system between said elbow and the trap of the sewage system whereby a suction action is created by the jet pipe in the nozzle outlet pipe.

3. An irrigator comprising a tank, an inlet pipe for the tank adapted to be connected to hot and cold faucets of a city or pressure water system, an outlet pipe rising from the top of the tank and provided with a branch which is vented, a second branch connected to said pipe intermediate the first named branch and the tank, a depending pipe connected to the first named branch and constituting a waste pipe, an elbow in the waste pipe adapted to be connected to a sewage system, a jet pipe adapted to be connected to the water system and entering the elbow to create a siphoning effect, a pipe connected to the second named branch pipe, a valve controlling the last named pipe, a tank for supplying a medicinal medium, an outlet for the last named tank, a valve controlling the last named outlet pipe, a common pipe connected to the said last named pipe and to the outlet pipe for the medicinal tank, a flexible hose connected to the common pipe, a nozzle for the hose having a reversely bent inlet connection with the hose, and a flexible conduit adapted to connect the nozzle with the sewage system whereby a suction action is created by the jet pipe in the nozzle outlet pipe.

4. An irrigator comprising a tank, an inlet pipe for the tank adapted to be connected to hot and cold faucets of a city or pressure water system, an outlet pipe rising from the top of the tank and provided with a branch having a vent therein, a second branch connected to said pipe intermediate its ends, a depending pipe connected to the first named branch and constituting a waste pipe, a connection between said waste pipe and a sewage system, a jet pipe adapted to be connected to the water system and entering said waste pipe to create a slight flow increase in said waste pipe, a conduit connected to said second named branch pipe, a nozzle having a reversely bent inlet connection with said conduit, and a connection between said nozzle and said sewage system, said connection being capable of obstruction periodically to cause flow of liquids out of said nozzle.

5. An irrigator comprising a mixing chamber, an inlet pipe for said chamber adapted to be connected to hot and cold faucets of a city or pressure water system, an outlet pipe rising from the top of the chamber and thence over and downwardly, a connection between the downwardly extending portion of said pipe and a sewage system, a conduit connected to said outlet pipe intermediate said mixing chamber and the upper portion of said pipe, a nozzle having a reversely bent inlet connection with said conduit and having an open outlet, and a pipe adapted to connect said nozzle with said sewage system, said last mentioned pipe being constructed to permit intermittent obstruction thereof whereby the flow of liquid will be directed through the outlet of said nozzle during the obstruction of said last mentioned pipe.

MILTON IRWIN.